July 25, 1961 C. J. MEYER 2,993,471
HOG FARROWING STALL
Filed May 5, 1958
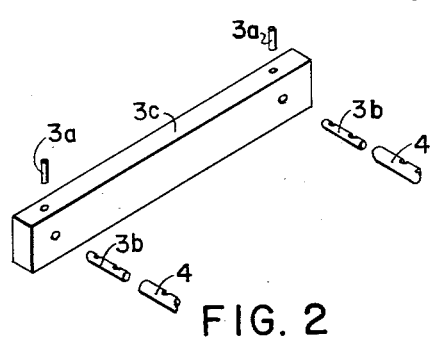
FIG. 2
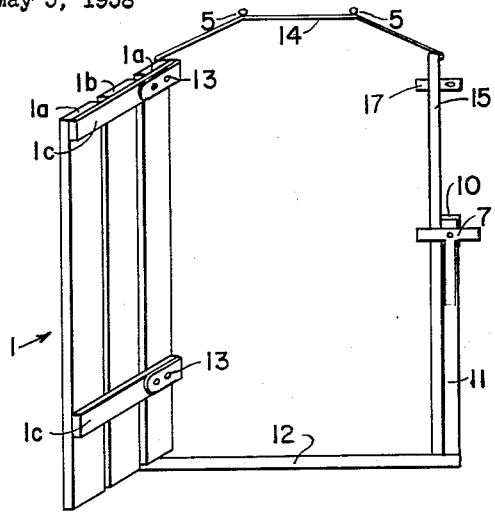
FIG. 3
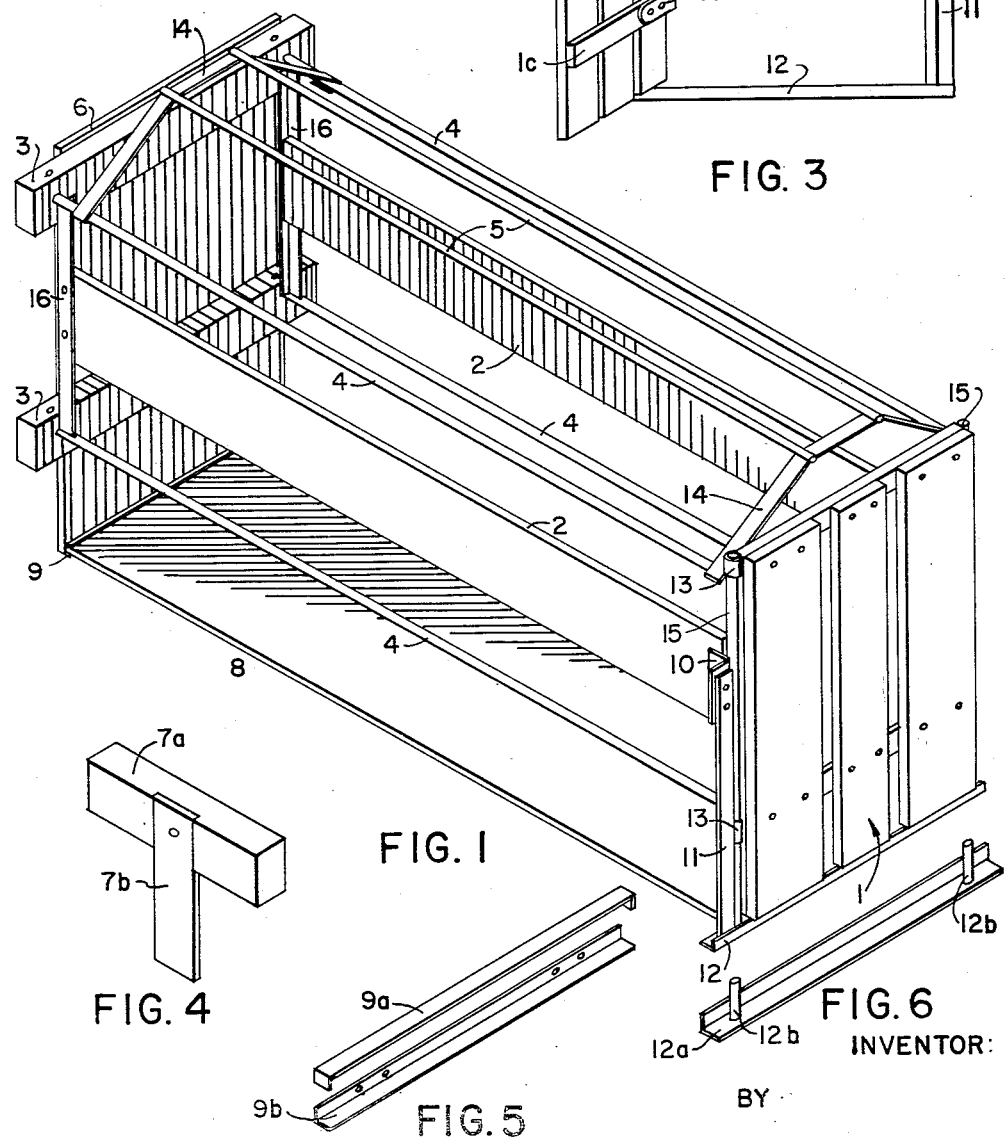
FIG. 1
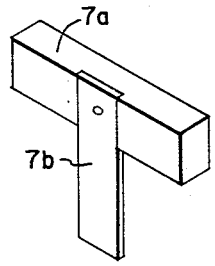
FIG. 4
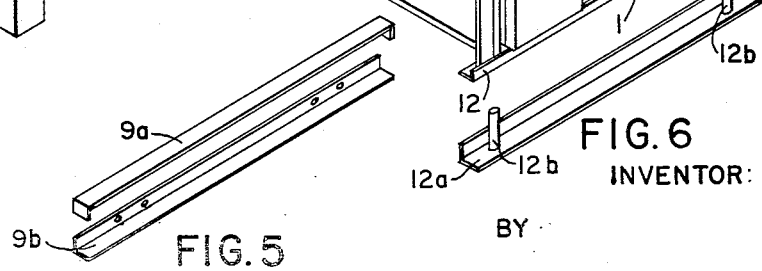
FIG. 5
FIG. 6
INVENTOR:
BY United States Patent Office 2,993,471
Patented July 25, 1961

2,993,471
HOG FARROWING STALL
Clarence J. Meyer, R.F.D., Monona, Iowa
Filed May 5, 1958, Ser. No. 734,077
2 Claims. (Cl. 119—20)

My invention relates to a hog farrowing stall of a simple type. The design is such that it may be assembled and installed with a minimum of effort in various ways without the use of supporting posts.

The stall has been in use by me for over a year and was shown at the Clayton County Iowa Swine Banquet on February 5, 1958, at Guttenberg, Iowa. My reasons for obtaining a patent on this stall are as follows:

(1) Simplicity of design and making of the stall.

(2) The stall may be carried in or out of a building in a matter of minutes and set up or disassembled leaving the building free for cleaning with machinery or for any other purposes.

(3) The stall has no bars across the top. This eliminates stooping or climbing over to get in beside the animal for any purpose.

(4) The stall has a top which is a must before farrowing. The top is separate and can be taken off only by pressing down. In trying to get out the animal would lift it up and lock it so it could not be opened. Yet it can be opened easily when desired.

(5) The stall has a gate that may not be thrown up or down by hogs. This also permits the hinges to be placed on either side for convenience.

(6) The stall has a gate latch. The weight of its balance helps keep it from opening.

(7) The animal relaxes in this stall. The combination of wood on the side with the iron makes the stall readily adjustable in height and more comfortable for the animal.

(8) The back and front are adjustable for different size animals.

(9) The floor does not require any nailing with the use of the closed channel in front on the floor. This enables a floor to be used in the stall and makes the stall efficient in holding the hog and all its uses.

(10) This stall is so constructed that additional units can be added so that any number of stalls can be constructed in a row.

(11) The stall may be used to hold, ship or weigh animals and can be disassembled for transportation.

In designing a farrowing stall it is of the utmost importance that it may be assembled and installed with a minimum of effort and readily adjustable to many situations. It must be adjustable to fit various sizes of hogs, have a front, top cover, convenient gate and be of such design so that it can be easily entered. The front of my stall is so built that it can be easily attached to a wall in many different ways. It may also have its own front made of other material, such as plywood. It is light in weight and can be disassembled and stored.

My stall is shown on an illustrative embodiment in the accompanying drawing in which:

FIGURE 1 is a perspective view illustrating a hog farrowing stall of the present invention;

FIGURE 2 is an exploded and broken perspective view illustrating the manner in which the front members of the stall are interconnected;

FIGURE 3 is a rear end elevation of the stall showing the door in perspective and in open condition;

FIGURE 4 is a perspective view of the latch for the gate or door of the stall;

FIGURE 5 is an exploded perspective view showing the members for holding the stall floor in place; and FIGURE 6 is a perspective view showing an angle iron and upstanding plugs which provide the foundation of the stall illustrated in FIGURE 1.

Referring to the embodiment of my invention illustrated in the drawings in greater detail:

(A) FIGURE 1 shows a type of farrowing stall of simple construction and made so that it may be used under most farming conditions. The floor 8 is held in position by members 9a and 9b (FIGURE 5) and therefore needs no nailing. The top, comprising pieces or strips of spring steel No. 14 and longitudinal members No. 5, which is necessary before farrowing, can be removed by pressing down to release the hooks of the straps from horizontal bars 4 or vice-versa. A board on each side aids in keeping the sow in. Bolt-receiving holes are provided on the inside of angle iron shown at 16 in front of the stall where it would be attached to the wall or front at different heights. No. 10 shows angle iron which is fastened to the vertical corner pipe 15 and supports the front and the partition 2 of plywood, or similar material used to divide multiple stalls.

(B) FIGURE 2 is made of such material so that it can be fastened to the wall and shows one method by which a series of stalls can easily be fastened together to accommodate any number of hogs.

(C) FIGURE 3: 1a represents a gate which facilitates getting sows in or out of the stall but still can not be raised or lowered by the animal. The door 1 comprises side vertical members 1a and a central vertical member 1b secured to a pair of horizontal cross members 1c, the latter being equipped with hinge straps 13 which pivotally receive portions of one of the posts or pipes 15. The door hinges may be fastened to the pipe on either side and thereby allowing the door to be open either way.

(D) FIGURE 4: 7a and 7b show a gate latch designed and balanced for ease in closing and self closing and hinges may be set on either side.

(E) FIGURE 5: 9a and 9b show the closed end channel that will hold the floor in place without the use of nails.

(F) FIGURE 6: 12a is an angle iron to which steel plugs 12b are fastened, each plug being releasably receiving by a corner post or leg 15 of the stall. The angle iron 11 in FIGURE 1 fits in and should be a part of FIGURE 6. Braces with holes at varying heights are fastened to each end of the angle iron where the stall would be raised, lowered or taken apart.

I have found that this farrowing stall is much simpler in construction and in operation can be readily assembled or taken down in five minutes or less. That it can be assembled for use and left standing for such times its use is necessary. It can be disassembled and readily transported in an automobile. It can be used for transporting hogs and the various demands make its use much simpler, yet prevent the hog from escaping by its own actions. I claim that the items contained herein are original with me and that I am entitled to a patent thereon:

1. In a hog farrowing stall having a pair of horizontal side bars spaced above a floor surface, a removable top including at least a pair of transversely-extending spring metal straps having downwardly inclined side portions and being provided with downwardly and inwardly turned spring hooks at the ends thereof, said hooks releasably receiving said side bars for anchoring said removable top in place, said hooks being released from said side bars by depressing the central portions of said straps and being anchored more tightly upon said bars by upward forces applied to said central portions.

2. In a hog farrowing stall having a pair of horizontal side bars spaced above a floor surface, a removable top including at least a pair of transversely-extending spring metal straps each having a horizontal central portion and having downwardly inclined side portions, said side portions being provided at their ends with downwardly and inwardly turned spring hooks releasably receiving said said bars for anchoring said removable top in place, said side portions of each of said straps being capable of flexing upwardly and outwardly with reference to said central portion to spread said hooks and to release said bars therefrom, whereby, said top is removable from said bars only by downward flexing movement of the side strap portions with reference to said bars.

References Cited in the file of this patent

UNITED STATES PATENTS

| | | |
|---|---|---|
| 1,381,892 | Bute | June 14, 1921 |
| 2,255,806 | Overson | Sept. 16, 1941 |
| 2,652,025 | Beatty | Sept. 15, 1953 |
| 2,688,308 | Hines | Sept. 7, 1954 |
| 2,764,127 | Newman | Sept. 25, 1956 |

UNITED STATES PATENT OFFICE
CERTIFICATE OF CORRECTION

Patent No. 2,993,471                                   July 25, 1961

Clarence J. Meyer

It is hereby certified that error appears in the above numbered patent requiring correction and that the said Letters Patent should read as corrected below.

Column 3, line 4, for "said", second occurrence, read -- side --.

Signed and sealed this 5th day of December 1961.

(SEAL)
Attest:

ERNEST W. SWIDER                             DAVID L. LADD
Attesting Officer                              Commissioner of Patents